(12) United States Patent
Kruesi et al.

(10) Patent No.: US 6,504,915 B1
(45) Date of Patent: Jan. 7, 2003

(54) MULTIPLE NODE MESSAGING SYSTEM WHEREIN NODES HAVE SHARED ACCESS TO MESSAGE STORES OF OTHER NODES

(75) Inventors: Frederick C. Kruesi, Exton, PA (US); Gary P. Russell, King of Prussia, PA (US); Linda K. Hahn, Chester Springs, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/161,214

(22) Filed: Sep. 25, 1998

(51) Int. Cl.$^7$ ............................................... H04M 11/00
(52) U.S. Cl. ................. 379/88.18; 370/235; 348/14.08; 707/1; 707/10; 709/206; 709/235
(58) Field of Search ............................. 379/88.18, 67.1, 379/68, 88.08, 88.09, 88.16; 370/235; 348/14.08; 707/1, 10; 709/206, 235

(56) References Cited

U.S. PATENT DOCUMENTS

| | | | |
|---|---|---|---|
| 4,688,212 A | 8/1987 | MacGinitie et al. | 370/85 |
| 5,029,199 A | 7/1991 | Jones et al. | 379/89 |
| 5,133,004 A | 7/1992 | Heileman, Jr. et al. | 379/67 |
| 5,138,710 A | 8/1992 | Kruesi et al. | 395/575 |
| 5,301,226 A | 4/1994 | Olson et al. | 379/67 |
| 5,323,450 A | 6/1994 | Goldhagen et al. | 379/100 |
| 5,384,829 A | 1/1995 | Heileman, Jr. et al. | 379/67 |
| 5,394,460 A | 2/1995 | Olson et al. | 379/67 |
| 5,513,314 A | 4/1996 | Kandasamy et al. | 395/182.04 |
| 5,557,668 A | 9/1996 | Brady | 379/212 |
| 5,572,709 A | 11/1996 | Fowler et al. | 395/500 |
| 5,592,611 A | 1/1997 | Midgely et al. | 395/182.02 |
| 5,608,865 A | 3/1997 | Midgely et al. | 395/180 |
| 5,613,108 A | 3/1997 | Morikawa | 393/616 |
| 5,623,538 A | 4/1997 | Petty | 379/67 |
| 5,633,999 A | 5/1997 | Clowes et al. | 395/182.04 |
| 5,659,599 A | 8/1997 | Arumainayagam et al. | 379/89 |
| 5,675,723 A | 10/1997 | Ekrot et al. | 395/182.02 |
| 5,678,042 A | 10/1997 | Pisello et al. | 395/610 |
| 5,680,551 A | 10/1997 | Martino, II | 395/200.15 |
| 5,689,550 A | * 11/1997 | Garson et al. | 348/14.08 |
| 5,689,706 A | 11/1997 | Rao et al. | 395/617 |
| 5,696,895 A | 12/1997 | Hemphill et al. | 395/182.02 |
| 5,724,347 A | 3/1998 | Bell et al. | 370/377 |
| 5,724,418 A | 3/1998 | Brady | 379/212 |
| 5,732,214 A | 3/1998 | Subrahmanyam | 395/200.12 |
| 5,740,231 A | 4/1998 | Cohn et al. | 379/89 |
| 5,898,841 A | * 4/1999 | Higgins | 709/235 |
| 5,950,203 A | * 9/1999 | Stakuis et al. | 707/10 |
| 5,951,638 A | * 9/1999 | Hoss et al. | 709/206 |
| 6,058,400 A | * 5/2000 | Slaughter | 707/1 |
| 6,181,780 B1 | * 1/2001 | Finnigan | 379/67.1 |
| 6,229,790 B1 | * 5/2001 | Butrym et al. | 370/235 |

FOREIGN PATENT DOCUMENTS

| | | |
|---|---|---|
| EP | 0 567 294 A | 10/1993 |
| EP | 0 760 573 A | 3/1997 |
| WO | WO 97 12469 | 4/1997 |

* cited by examiner

Primary Examiner—Fan Tsang
Assistant Examiner—Gerald Gauthier
(74) Attorney, Agent, or Firm—Woodcock Washburn; Michael B. Atlass; Mark T. Starr

(57) ABSTRACT

A distributed messaging system comprises a first node including a first messaging platform and a first voice file, wherein the first messaging platform is provided with read/write access to the first voice file. In addition, the system includes a second node having a second messaging platform and a second voice file, and having read/write access to the second voice file. The first messaging system is further provided with read only access to the second voice file, and the second messaging system is further provided with read only access to the first voice file.

52 Claims, 5 Drawing Sheets

MULTIPLE NODE MESSAGING SYSTEM WHEREIN NODES HAVE SHARED ACCESS TO MESSAGE STORES OF OTHER NODES

FIELD OF THE INVENTION

The present invention relates generally to messaging systems, and more particularly to a multiple node messaging system wherein each node has shared access to the message stores of other nodes.

BACKGROUND OF THE INVENTION

Messaging systems that provide voice, fax and/or e-mail messaging capabilities are well known. FIG. 1 illustrates an exemplary prior art messaging system developed by Unisys Corporation, the assignee of the present invention. The system of FIG. 1 comprises multiple servers (e.g., an A-series or Clearpath™ computer offered by Unisys Corp.) each supporting a network applications platform (NAP), which provides an underlying platform for storage and retrieval of messages, and a messaging application running on the platform. A voice mail application, such as the Unisys Universal Voice Messaging System (UVMS), is an example of a messaging application that runs on the messaging platform. The UVMS application determines how calls to the messaging system are handled, what prompts are played to callers, and which features are available. Such applications typically maintain a database of subscribers who have "mailboxes" on the system. The messaging platform interfaces to a telephone network through a Network Interface Unit (NIU). Received messages are stored by the messaging platform in a local message store, or voice file.

Network Interface Units are available from a number of different vendors. For example, NIUs suitable for use with the present invention include: (a) the Telephony Services Platform available from Unisys Corporation, Blue Bell, Pa.; (b) the Summa Four VCO 80 available from Summa Four, Inc., Manchester, N.H.; and (c) the Voice Frame 2020 available from Harris Corporation, Melbourne, Fla. The Telephony Services Platform (TSP) is most preferred. The difference between it and the other products just mentioned is that the TSP includes a board that plays back digitized voice from a voice file whereas the other products require a separate playback module.

In use, if a subscriber is not available when an incoming call is received, the Public Switched Telephone Network (PSTN) forwards the call to the messaging system, which typically allows the caller to record a message, and then will store the message for later retrieval by the subscriber. A key (or token) will be returned to the messaging application that uniquely identifies the stored message data within the message store. This key can be used at a later time to retrieve the message from the message store for playback to the subscriber.

In the exemplary system shown in FIG. 1, a first node of the system comprises a server/NAP 10a, voice file and database 12a and NIU 14a. Similarly, a second node comprises a server/NAP 10b, voice file and database 12b and NIU 14b; and a third node comprises a server/NAP 10c, voice file and database 12c and NIU 14c. The first node could be responsible for a predefined geographic area encompassing hundreds of thousands of subscribers. For example, the first node could be responsible for a large area such as Northern California, the second node could be responsible for Middle California, and the third node could be responsible for Southern California. The respective nodes are separately coupled to a public switched telephone network, or PSTN, 16, and are thereby made accessible to their subscribers. Moreover, subscribers of one node can employ messaging to transfer copies of messages (such as voice messages) to subscribers of another node. The respective nodes, however, do not share access to each other's voice files, databases or NIUs.

FIG. 2 depicts the structure of the voice files 12 and database. This structure is described in detail in U.S. Pat. No. 5,138,710, Aug. 11, 1992, "Apparatus and Method for Providing Recoverability in Mass Storage Data Base Systems Without Audit Trail Mechanisms." Briefly, each voice file is made up of a first database 12-1 (referred to as a Voice I/O Database, or VIODB) and a second database 12-2, which is referred to as the "flat file" in the '710 patent. The VIODB 12-1 contains a series of records each of which includes a 48-bit (or 6-byte) message number (MN) and a series of pointers. Each pointer identifies a different voice message segment (VMS) in the flat file 12-2. Each VMS comprises 32,256 bytes of voice data and is associated with recovery data (RD) including the MN corresponding to that VMS, the number of bytes in the voice message segment with that MN, as well as other information.

The VIODB 12-1 is utilized to provide access to stored data in the flat file 12-2. In the embodiment disclosed in detail in the '710 patent, each record in the VIODB 12-1 comprises a Message Number (MN), Sequence Number (SN), Segment Counter (SC), DB Number (DBN), Incomplete Message Flag (IMF), and Segment Descriptors (SD). The MN is a token used to identify and access messages. When a message is received by the system, a Message Number that is unique within the particular node is created and returned to the client application. The Sequence Number is utilized when a message requires more Message Segments (MS) than the maximum number of Segment Descriptors in a single database record. The Segment Counter indicates the number of Message Segments in a message. The DB Number is utilized to associate this message with a particular client application. The Incomplete Message Flag indicates that the message was not fully reconstructed during recovery of the database from the flat file 12-2 because of I/O errors. Each Segment Descriptor contains a pointer that contains an address (record number) of a Message Segment in the flat file and a field that indicates the number of bytes in the MS. The structure of the flat file 12-2 is based on each message comprising Message Segments stored as a record in the flat file at an address identified by the corresponding SD.

The recovery data (RD) is utilized to provide data integrity and could be used to recover the VIODB 12-1 in the event that it was damaged beyond repair such that it could not be recovered by database management algorithms. Moreover, the RD could be used if synchronization between the VIODB 12-1 and the voice file 12-2 is ever lost. This loss of synchronization could occur if the database VIODB 12-1 was not able to be fully recovered to the same point in time as the voice file. The RD comprises the following data items: an Available Marker (AM) indicating whether a MS is in use or available; a Self Pointer (SP) containing the flat file address of the containing MS; a Message Number (MN) that indicates which message the MS belongs to; a Segment Sequence Number (SSN) indicating the order in which the Message Segments were received; a Data Base Number (DBN) indicating which client application owns the MS; a Final Flag (FF) indicating that the MS is the last MS of a message; a Length (L) indicating the number of valid bytes in the MS; a Last Address (LA) pointing to the last MS of a message; and a Checksum used to verify integrity.

An important characteristic of a messaging system is that it be highly reliable and able to quickly recover from system failures. This characteristic is generally referred to as system "availability." The present invention relates to a messaging system architecture that comprises multiple redundant messaging nodes in order to achieve high availability. In other words, the present invention was developed in the process of designing a messaging system that would continue to provide access to messages stored in one disk file (say, voice file 12a) even while its corresponding host (server/NAP 10a) is inoperative. A related aspect of the present invention concerns the structure of the voice files. Although the voice file structure described above and depicted in FIG. 2 permits the messaging system to receive, store and retrieve high volumes of real-time data, it is not suited for use in a shared disk system of the kind employed in accordance with the present invention because the database 12-1 cannot be shared by multiple systems. Generally, a database cannot be shared because much of the database state is maintained in memory. A node reading the database (on disk) without access to the information in memory would get inconsistent information. Although one node, say 10a of FIG. 1, could act as a server for another node, say 10b, this would most likely not meet the real-time requirements associated with messaging systems. Moreover, it would make the nodes dependent (in this example, 10b would need to be operational for node 10a to be operational).

Even if the database issues could be solved, there would still be a problem with Message Numbers. Message Numbers are unique over all time, but only within a node. If multiple nodes are involved, the Message Numbers are not unique. Non-unique message numbers could allow the wrong message to be played out due to MN reuse.

Further background information concerning the construction and operation of messaging systems, and particularly systems employing a Network Applications Platform (NAP) for interfacing a telephone network and network applications running on an enterprise server, may be found in the following patents and copending patent applications:

U.S. Pat. No. 5,133,004, Jul. 21, 1992, "Digital Computer Platform for Supporting Telephone Network Applications".

U.S. Pat. No. 5,138,710, Aug. 11, 1992, "Apparatus and Method for Providing Recoverability in Mass Storage Data Base Systems Without Audit Trail Mechanisms";

U.S. Pat. No. 5,384,829, Jan. 24, 1995, "Digital Computer Platform for Supporting Telephone Network Applications";

U.S. Pat. No. 5,323,450, Jun. 21, 1994, "Telephone Network Applications Platform for Supporting Facsimile Applications";

U.S. Pat. No. 5,494,606, Feb. 20, 1996, "Multi-Lingual Prompt Management System for a Network Applications Platform";

U.S. Pat. No. 5,633,916, May 27, 1997, "Universal Messaging Service Using Single Voice Grade Telephone Line Within a Client/Server Architecture";

U.S. patent application Ser. No. 08/944,924, filed Oct. 6, 1997, "Enhanced Multi-Lingual Prompt Management in a Voice Messaging System With Support for Speech Recognition";

U.S. patent application Ser. No. 08/964,744, filed November 5, 1997, "Methods and Apparatus for Providing External Access to Executable Call Flows of a Network Application";

U.S. patent aplication Ser. No. 08/987,571, filed Dec. 11, 1997, "Multiple Language Electronic Mail Notification of Received Voice and/or Fax Messages".

U.S. patent application Ser. No. 09/094,126, filed Jun. 9, 1998, titled "Universal Messaging System Providing Integrated Voice, Data and Fax Messaging Services to PC/Web-based Clients, Including a Session Manager for Maintaining a Session Between a Messaging Platform and the Web-based Clients";

U.S. patent application Ser. No. 09/093,593, filed Jun. 9, 1998, titled "Universal Messaging System Providing Integrated Voice, Data and Fax Messaging Services to PC/Web-based Clients, Including a Content Manager for Receiving Information from Content Providers and Formatting the Same into Multimedia Containers for Distribution to Web-based Clients";

U.S. patent application Ser. No. 09/094,266, filed Jun. 9, 1998, titled "Universal Messaging System Providing Integrated Voice, Data and Fax Messaging Services to PC/Web-based Clients, Including a Large Oject Server for Efficiently Distributing Voice/Fax Messages to Web-based Clients"; and U.S. patent application Ser. No. 09/094,026, filed Jun. 9, 1998, "System and Method for Integrating Notification Functions of Two Messaging Systems in a Universal Messaging Solution".

SUMMARY OF THE INVENTION

A primary objective of the present invention is to provide an architecture for a highly reliable messaging system that is able to quickly recover from system failures. The present invention achieves this goal with a messaging system architecture that comprises multiple (at least two) redundant messaging nodes having shared access to each other's voice files. In addition, the invention provides a new voice file structure that is suited for use with the inventive system architecture.

An exemplary embodiment of the present invention includes two nodes, with each node representing a complete messaging system, i.e., each node could function as a standalone messaging system. As discussed, multiple nodes provide redundancy to the architecture. According to the architecture of the present invention, each node maintains its own message store (also referred to herein as a "voice file") in which messages received by that node are stored. Each node thus has read/write access to its own message store. In addition, however, for purposes of achieving high availability, each node further has read-only access to the message stores of each other node in the system. Therefore, in this embodiment, any node can use its read-only access to the message store of a different node in order to play back a message from that message store. Because any node can play back a message stored on any other node, any node can receive and store messages for any subscriber. Therefore, messages can be stored across multiple nodes in a distributed manner.

Because it is often the case that a subscriber desires to delete a stored message once it has been played back, a node that uses its read-only access to play back a message from the message store of another node can also request that the other node then delete the message from its store. This is done via a "Delete Request" issued to the node that "owns" the message store. Delete requests generally do not have the same real-time constraints as receiving or playing messages. Moreover, even if a delete request is not processed, a process known as "orphan reconciliation" will rid the system of undesired messages. Orphan reconciliation compares the message numbers in the application database with those in the voice file. Any message numbers that are in the voice file but not in the application database are deleted.

According to an additional feature of the architecture of the present invention, in the event that one of the nodes in the system fails, one of the other available nodes can acquire read/write access to the message store of the failed node. In this way, the rest of the system can continue to use the available storage space in the message store of the failed node. The acquired read/write status can be maintained as long as necessary, e.g., until the failed node comes back on-line.

Yet another aspect of the present invention is that it is not necessary to duplicate messages on more than one node. Each stored message is uniquely identifiable across all nodes. This is achieved in the preferred embodiment by assigning a message number to each stored message that comprises a first part that identifies the particular disk file in which the message is stored and a second part that identifies the location of that message within the specified file.

Other features of the invention are described below.

DETAILED DESCRIPTION OF PREFERRED EMBODIMENTS

Figure 3A:
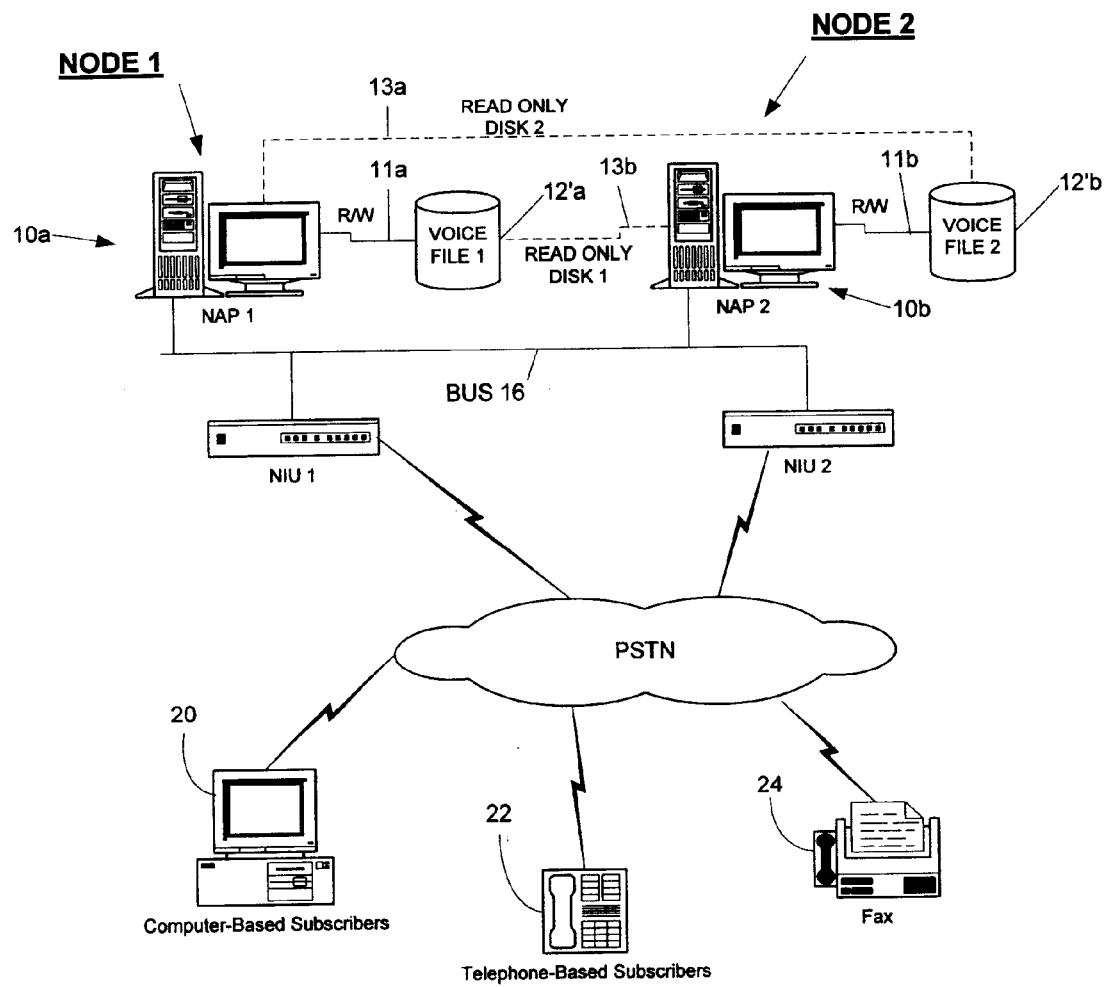
FIGS. 3A and 3B schematically depict alternative embodiments of a messaging system in accordance with the present invention.

FIG. 3A depicts a first preferred embodiment of a distributed messaging system in accordance with the present invention. As shown, this embodiment includes first and second nodes coupled via a PSTN to a plurality of subscribers, which could include computer-based subscribers 20, telephone-based subscribers 22 and fax-based subscribers 24. Node 1 includes a messaging platform 10a having read/write access, via a first bus or cable 11a, to a disk-based voice file 12'a. Similarly, Node 2 includes a messaging platform 10b having read/write access via a second bus or cable 11b to a second voice file 12'b. In addition, each messaging platform has read-only access to the voice file on the other node. Thus, messaging platform 10a has read-only access, via bus or cable 13a, to voice file 12'b; and messaging platform 10b has read-only access via bus or cable 13b to voice file 12'a. Each messaging platform is also coupled via a bus 16 (e.g., a Small Computer System Interface (SCSI) bus) to at least one, and preferably plural, NIUs, which serve as interfaces to the PSTN. It should be noted that the present invention is by no means limited to the manner in which the messaging platforms 10a and 10b are physically connected to the voice files 12'a and 12'b. That is, any type of bus architecture or cable, or even wireless interface, could be used in carrying out the invention. Moreover, although FIG. 3A shows a single bus 16, multiple buses could be used to connect the NIUs to the NAP system, i.e., each NIU could have a dedicated bus to connect it to the messaging platforms 10a and 10b. Such an architecture eliminates a single point of failure that would otherwise be present.

Each NAP (Network Applications Platform) employed to provide a messaging platform (10a, 10b) comprises a combination of software and hardware that facilitates the development and deployment of network applications. The network applications provide a service to a subscriber or are used to control network resources. Each NIU (e.g., Telephony Services Platform), on the other hand, comprises a connection between the system and various network lines and trunks. It provides an interface to a Signaling System Number 7 (SS7) network and supports T1 and E1 lines.

The structure of the voice files 12'a and 12'b has been designed in accordance with the present invention to reliably and efficiently facilitate the distributed, shared disk architecture of the present invention. This aspect of the present invention is described in detail below with reference to FIGS. 4A and 4B.

Figure 3B:
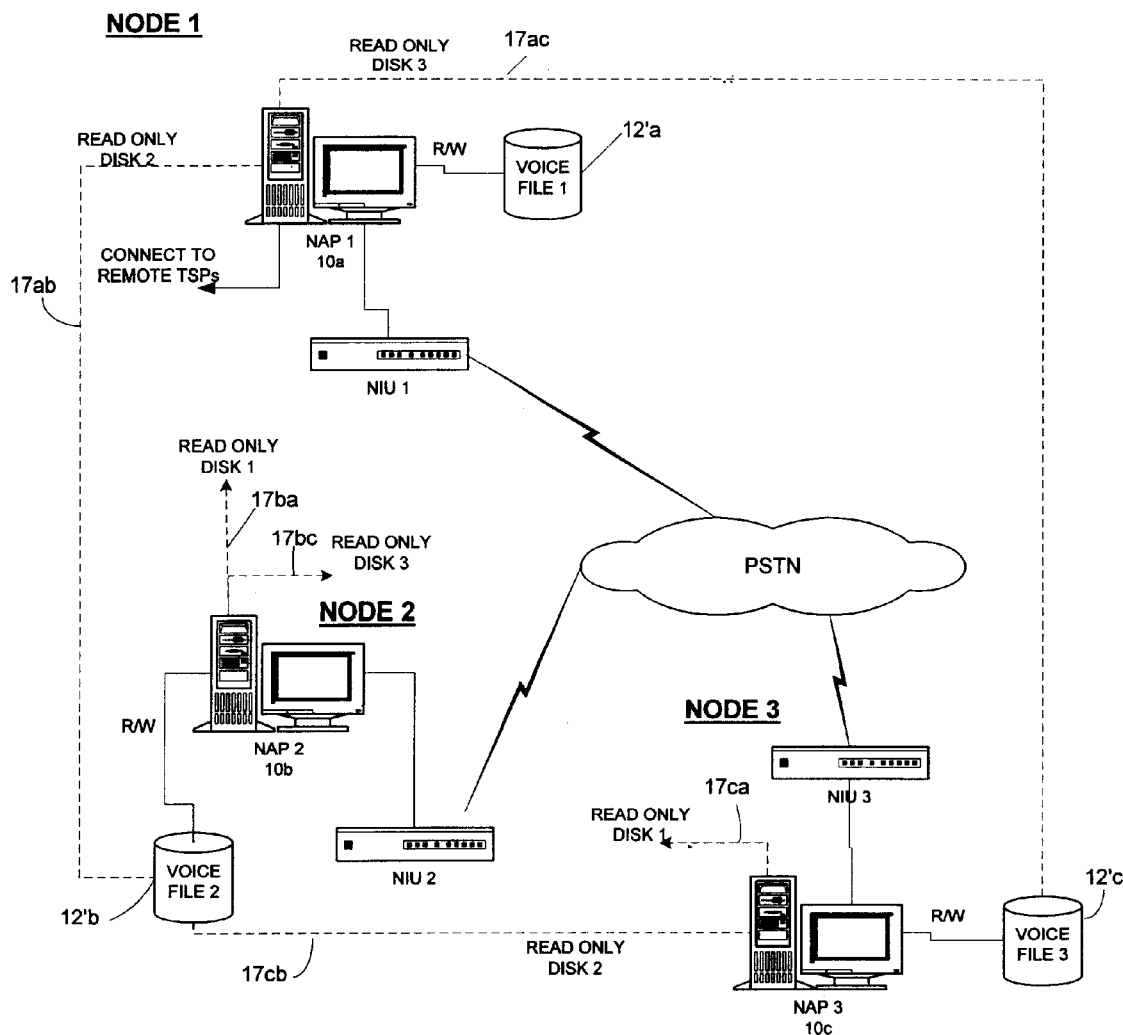

Another embodiment of the present invention is depicted in FIG. 3B. In this embodiment, the nodes are geographically dispersed (i.e., they are not collocated as in FIG. 3A) and utilize telecommunications to share access to each other node's voice file and NIU. Thus, e.g., Node 1 employs a telecommunications link 17ac to maintain read-only access to voice file 12'c on Node 3; and similarly employs telecommunications link 17ac to maintain read-only access to Node 2's voice file 12'b. In a like manner, links 17ba and 17bc provide to Node 2 read-only access to the voice files on Node 1 and Node 3; and links 17ca and 17cb provide to Node 3 read-only access to Node 1's and Node 2's voice files.

In a preferred embodiment, in which the NIUs comprise Unisys Telephony Services Platforms (TSPs), it is also within the scope of the present invention to provide each node with concurrent access to the TSPs on the other nodes. Sharing a TSP (or TSPs) increases the overall system availability because the TSP can route a call to any available host. Thus, even in the event of a node failure, the voice or signaling paths are still usable.

As discussed above with reference to FIGS. 3A and 3B, disk access in the presently preferred embodiments of the invention is generally provided by connections separate from the PSTN. For current implementations of the invention, the messaging platforms (host computers) involved will be located close to each other and current disk technology (e.g., SCSI) will be used for the connections. This current technology has limits in terms of the allowed distance of a host computer from a disk peripheral; however, emerging and future technologies will allow remote location of the hosts. The disks may be located in yet a third location entirely remote from the host systems (perhaps with a mirrored set of disks at yet a fourth location, for disaster recovery). Moreover, with the foreseeable merging of the PSTN with the Internet (and future higher-bandwidth technologies), the possibility exists that the disk I/O traffic may be carried on the same physical network (connections) as the voice traffic.

Accordingly, it is apparent that, typically, a separate connection will be used to connect the host systems to the disk/voice files. However, one should not think of a disk or voice file as belonging to one system with an additional connection to the other(s). Instead, the disk or voice file is considered to be attached to a bus along with several messaging systems. While we logically might associate a particular disk with a particular host, there is physically no real preference for one host over another. Indeed, there is physically nothing to stop each host from "simultaneously" writing to the disk, although software coordination is required to ensure that only one host updates the data and the others simply read it. The present invention utilizes such software coordination together with the ability to transfer the "write-capability" between the hosts.

In the preferred embodiment in which the NIUs comprise Unisys TSPs, the same situation applies to the TSPs, which are currently also SCSI devices; i.e., a TSP and several hosts will all be connected to the same SCSI cable, allowing any of the hosts to communicate with the TSP. In the case of the TSPs, however, each and all of the hosts may read from and write to the TSPs. This is because a TSP will preferably support many voice channels, and a channel will be assigned to a particular host for a period of time, but each channel can be assigned to a different host.

In the case of a disk, there will only be one writer at a time because writing to a disk generally requires a coordinated update to several data structures (file directory structures, etc.). Coordination of such updates by multiple hosts in a real-time environment would be impractical. Hence, having only one writer drastically simplifies the mechanism while still providing the flexibility of allowing multiple hosts to read the data.

Figure 1:
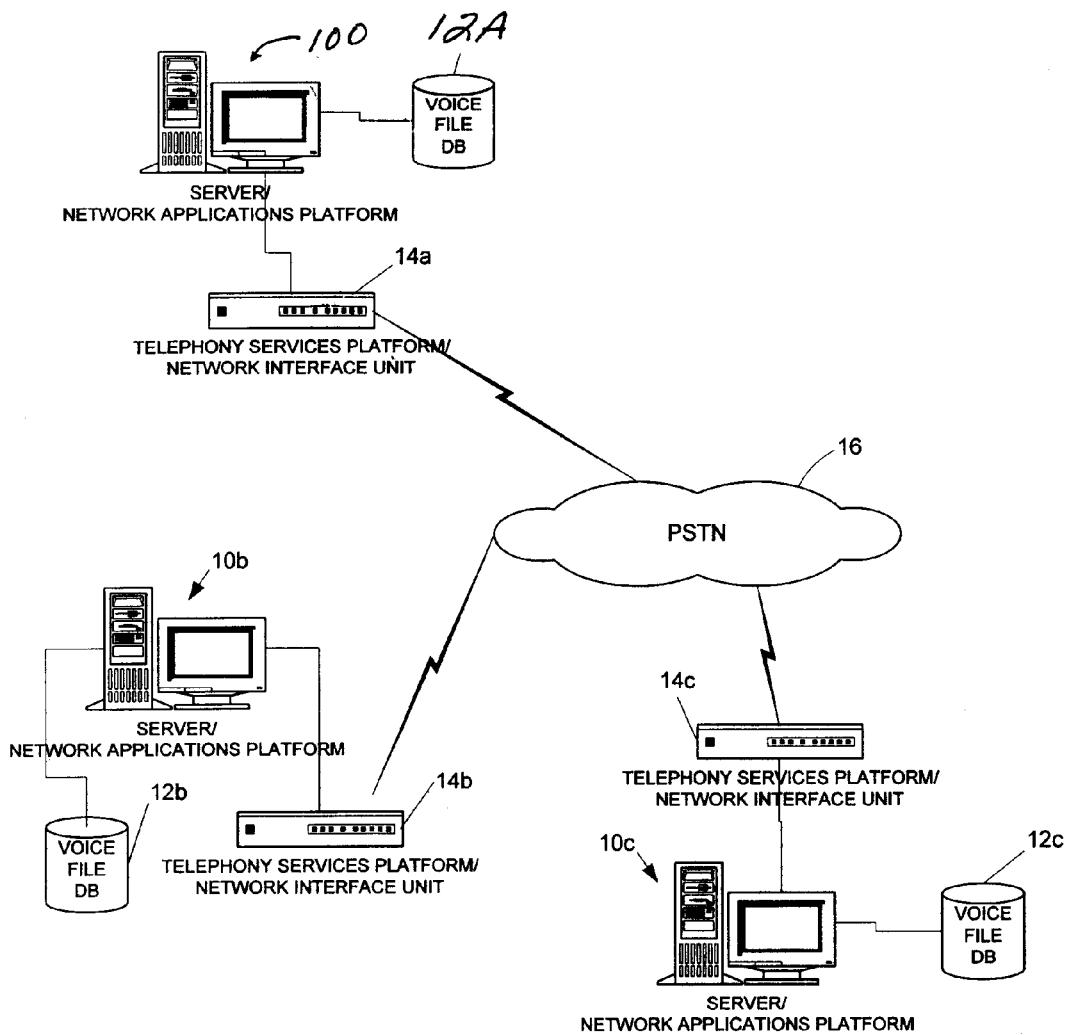
FIG. 1 schematically depicts a messaging system in accordance with the prior art.
Figure 2:
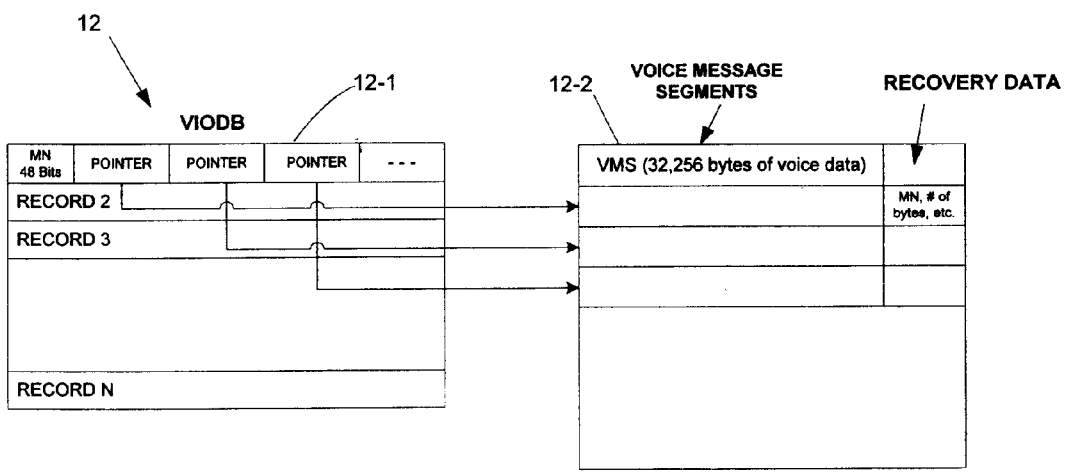
FIG. 2 schematically depicts the structure of a voice file database employed in the system of FIG. 1.
Figure 4A:
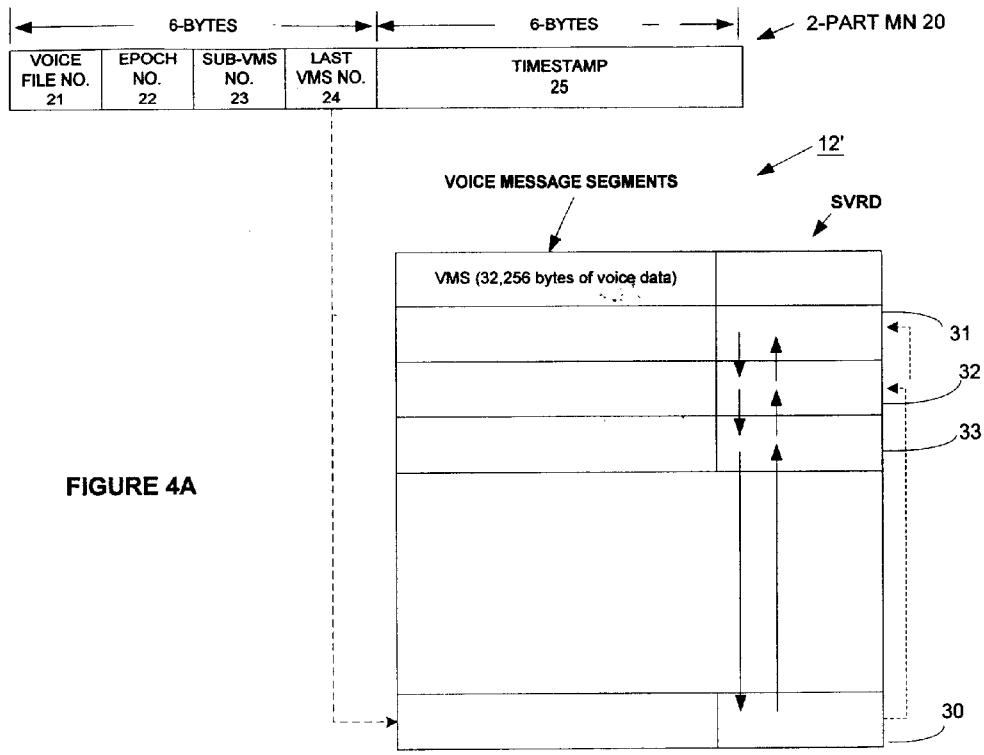
FIGS. 4A and 4B schematically depict the structure of a voice file in accordance with the present invention.
Figure 4B:
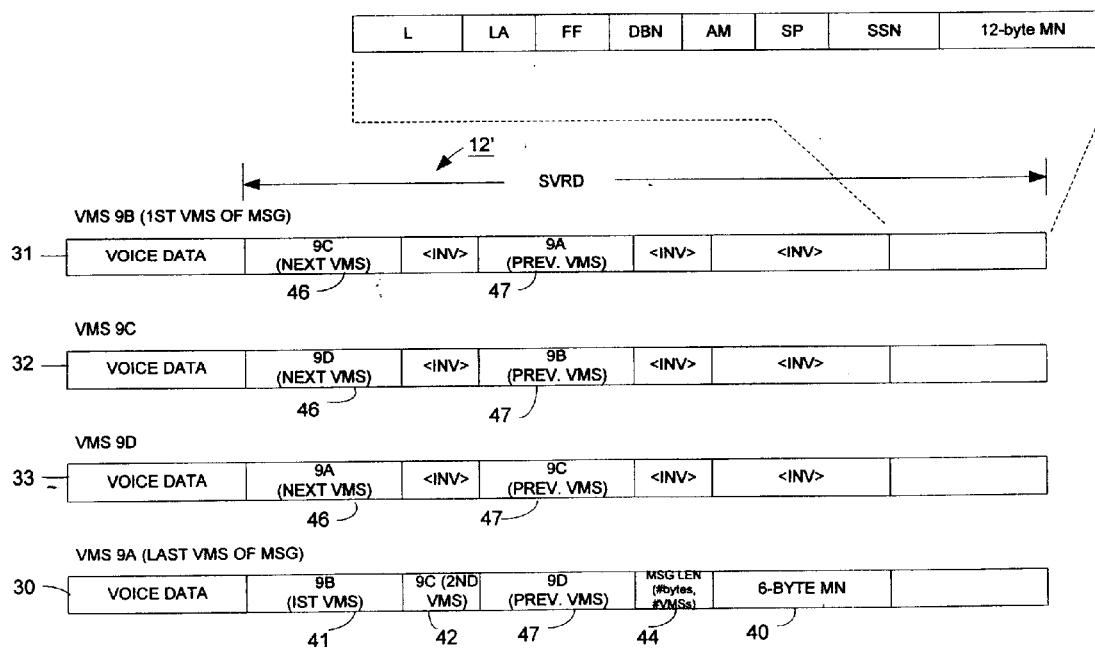

Referring to FIGS. 4A and 4B, a presently preferred architecture for a voice file 12' in accordance with the present invention will now be described. As shown, the inventive voice file 12' is characterized by a structure including a plurality of records 30, 31, 32, 33, etc., wherein each record comprises a voice message segment (VMS) and recovery data (RD). The recovery data is made up of modified recovery data described above in connection with the discussion of the prior system depicted in FIG. 1, and additional recovery data. Together these items form the Shared Voice File Recovery Data (SVFRD). The VMS and recovery data is constructed in much the same manner as the VMS 12-2 and RD of the voice file 12 in FIG. 2. In contrast to the prior system, a new style of Message Number is used and the new voice file 12' does not include the VIODB 12-1. In addition, the new voice file 12' is distinguished by the SVFRD. The use of the SVFRD in combination with the new style of Message Number forms a distributed directory where the directory is distributed by virtue of the message number. It is this distributed directory that permits the voice file to be shared.

As shown in FIG. 4A, the Message Number 20 employed by the present invention is made up of two parts: (1) a 6-byte series of numbers formed by a voice file number 21, epoch number 22, sub-VMS number 23 and last VMS number 24; and (2) a 6-byte timestamp 25, which indicates the time and date the corresponding message was created.

The last VMS number 24 serves as a pointer to the record 30 in the voice file 12' containing the last VMS of the corresponding message. As indicated in FIG. 4A, the record 30 containing the last VMS pointed to by the last VMS number 24 in turn points to the two records 31 and 32 containing the first two VMSs of the message. Pointing to two VMSs is intended to optimize the speed of the system in retrieving messages from the voice file 12' by permitting the system to retrieve the first two VMSs immediately.

The voice file number 21 stored as part of the 12-byte MN 20 serves to identify the voice file in which the message is stored. According to the present invention, the voice file number is unique across all voice files of a shared system; i.e., it uniquely identifies only one of the voice files to which the messaging platforms have shared access. As previously stated, it is important that the MN be unique over all systems over all time. This uniqueness is provided by the combination of voice file number, last VMS number, epoch and timestamp. The voice file number is unique over all systems, but there are many messages in the voice file. For each voice file, the last VMS number uniquely defines a message. These items alone would allow a message number to be unique over all systems, but not unique over all time. In order to be unique over all time, a timestamp is included. Since there is a limit to the resolution of the timestamp, it is necessary to have an epoch that is incremented each time the VMS is used as a last VMS. VMS reuse algorithms along with the incrementing of the epoch add sufficient resolution to the timestamp to make it unique over all time.

The sub-VMS number allows a VMS to be divided into multiple parts, thus making more efficient use of disk space. For example, a spoken name takes a small amount of disk space, but would have to be stored in a 32,256-byte container if the VMS is not divided using the sub-VMS number.

In accordance with the present invention, the SVFRD includes the 12-byte MN 20 in a predefined field of each record of each message. The MN 20 is stored in each record to ensure message integrity. That is, before a VMS is used it is checked (using the MN) to ensure that it belongs to the message. Pointers between records (described below) are used to get from one VMS to the next, but the VMS is always verified before it is used.

The MN 20 is created when voice or fax data is received by the system. As described above, the MN is composed of several fields, including a voice file number 21, epoch number 22, sub-VMS number 23, last VMS number 24 and timestamp 25. The timestamp 25 may be created by obtaining the current time and date. The last VMS number 24 may be obtained by searching a table and finding a VMS (the last VMS is obtained first). The voice file number 21 may be obtained by knowing from which voice file the VMS was obtained. The sub-VMS number 23 may be obtained by knowing which part of the VMS is being allocated. If the entire VMS is being used, this may be indicated by setting the sub-VMS number to zero.

For each VMS, the prior epoch value is retained even though the VMS is available or being used for a new message. It is when a VMS is selected to be used as a last VMS that the prior epoch value is incremented. Once incremented, the new epoch value is retained and used as part of the MN 20 the next time the VMS is used as a last VMS.

In order to provide the maximum amount of time between when a VMS is available for reuse and the VMS is actually reused, VMSs are preferably allocated round robin on a given disk pack and then round robin across all disk packs of the voice file. Increasing the time between VMS reuse ensures that the MN is unique by allowing the epoch 22 to break any tie that would be caused by lack of timestamp resolution. It is reasonable to assume that the timestamp 25 may not be not unique since it has a finite resolution. Thus, if the timestamp is obtained within the limit of the resolution, it will not be unique. The epoch 22 was introduced to prevent this from rendering the MN 20 non-unique. If the VMS is reused quickly enough, even the epoch may not make the MN unique. Thus, reusing VMSs round robin and only incrementing the epoch when the VMS is used as a last VMS allows the maximum amount of time between incrementing the epoch. For example, if the timestamp has a resolution of 38 microseconds, in order to increment the timestamp a disk 10 operation taking about 20 milliseconds would be required. In addition, a disk IO operation to store the voice or fax data would be required. In this case, we actually would not have a problem without the epoch. However, in the future, disks may get faster and thus the epoch would be required. (The algorithm could fail if disk IO time was reduced to 0.6 microseconds, a single available VMS was in the voice file and the received message was of zero length. If obtaining the data (receiving a fax or receiving a message) takes longer than 38 microseconds, the algorithm will never fail. Since not all systems may have a timer resolution of 38 microseconds, it is beneficial to employ the epoch number.

As shown in FIG. 4B, the record 30 containing the last VMS of the message includes pointers 41 and 42 to the first and second VMSs 31 and 32 of the message. In addition, this record includes a pointer 47 to the previous VMS and a number 44 representing the message length in terms of the number of bytes and the number of VMSs in the message.

In contrast to the record 30 containing the last VMS, the other records 31, 32, 33, etc., corresponding to a particular message contain only pointers 46 and 47 to a next VMS and a previous VMS, respectively. (Note that the previous VMS pointer 47 of the first VMS 31 points to the last VMS and there is no next VMS in the last VMS because it is replaced by the first VMS pointer. Accordingly, it is only necessary that the SVFRD comprises, in each record except those containing a first and a last VMS of each message, a pointer to a next VMS and a previous VMS in the message.)

For normal operations, only the first VMS pointer 41, second VMS pointer 42 and next pointers 46 are required. That is, given a last VMS, it is possible to access all other VMSs associated with the message. If a message becomes damaged due to a disk error, the previous pointers 47, next pointers 46, first VMS 41 and second VMS 42 may allow the message to be rebuilt (dependent on the scope of the damage).

With reference to FIG. 4B, the last VMS 30 contains a 6-byte MN 40. This MN is the same MN that is associated with the prior art and referenced in FIG. 2. This MN will be used to migrate applications from a 6-byte MN to a 12-byte MN. Specifically, an application can declare that it wants to continue to use a 6-byte MN. In this case a 6-byte MN will be created and stored in VIODB. The VIODB record will contain a mapping from the 6-byte MN to the 12-byte MN. The 6-byte MN 40 is used to coordinate access to the record if the 6-byte MN and 12-byte MN are being used simultaneously. It should be noted that applications must use 12-byte MNs if voice data is to be shared.

A procedure is also provided which permits an application to obtain a 12-byte MN given a 6-byte MN. This procedure permits an application to convert all 6-byte MNs to 12-byte MNs when desired by the application.

Figure 5A:
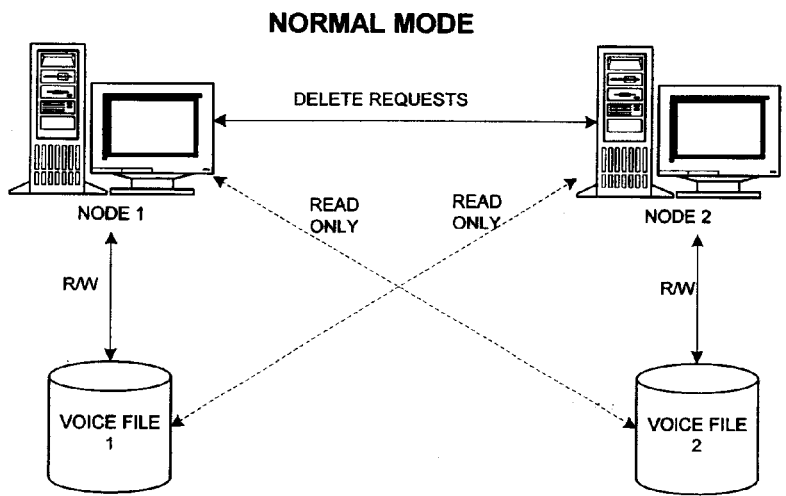
FIGS. 5A–5C depict normal mode, failure mode and temporary post-failure mode operations, respectively, of a messaging system in accordance with the present invention.
Figure 5B:
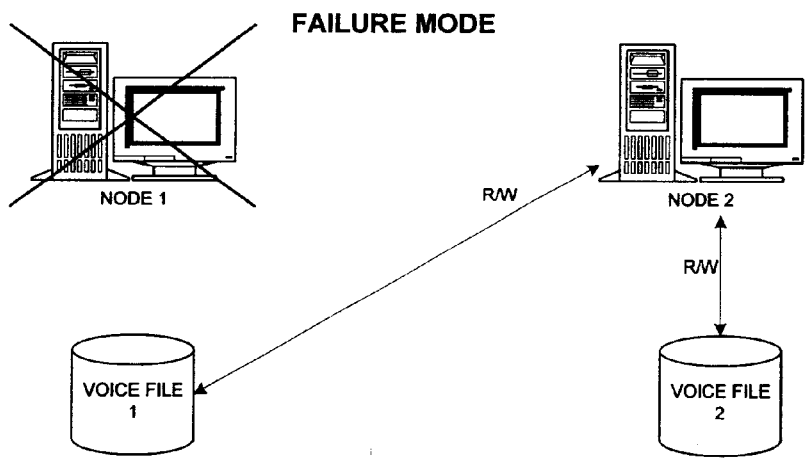
Figure 5C:
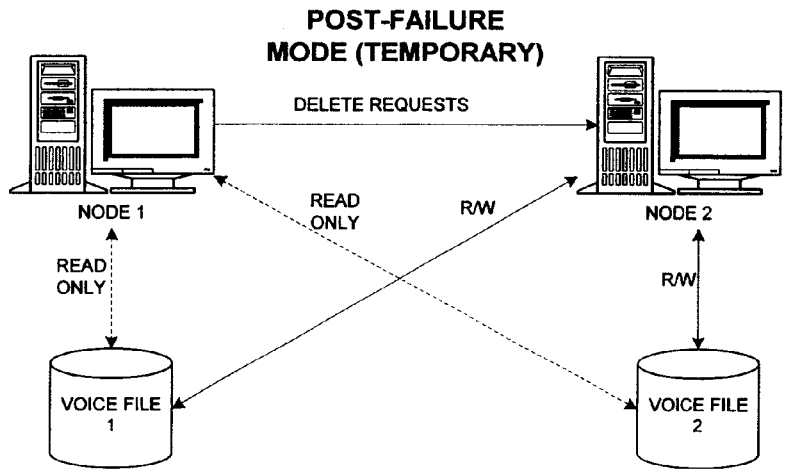

The overall operation of the inventive shared disk, or shared voice file, architecture will now be summarized with reference to FIGS. 5A–5C. In the "normal mode" (FIG. 5A), each node has read/write access to one voice file and read-only access to another voice file. Thus, Node 1 has read/write access to voice file 1 and read-only access to voice file 2. Similarly, Node 2 has read/write access to voice file 2 and read-only access to voice file 1. In addition, each node may request that the other node delete certain specified messages from the voice file the other node has write access to.

In a "failure mode" (FIG. 5B), it is assumed that one of the nodes, say, Node 1, has failed and cannot read or write messages. In this case, the other node, Node 2, is given read/write access to voice file 1. In the "post-failure mode" (FIG. 5C), the failed node, Node 1, has recovered yet the other node, Node 2, maintains temporary read/write access to voice file 1. The nodes can continue to operate this way until the system administrator determines that "normal mode" should be reinstated. For example, the administrator may want to ensure that Node 1 is stable before giving it read/write access.

In conclusion, we have described inventive system and voice file architectures for use in a messaging system, particularly a voice mail system. It should be noted, however, that the scope of protection of the claims set forth below is not intended to be limited to the particulars described herein in connection with the detailed description of presently preferred embodiments.

We claim:

1. A distributed voice messaging system, comprising:
   (a) a first node including a first voice messaging platform and a first voice file, wherein said first voice messaging platform is provided with read/write access to said first voice file; and
   (b) a second node including a second voice messaging platform and a second voice file, wherein said second voice messaging platform is provided with read/write provided with read only access to said first voice file;
   wherein said first voice messeging platform is further provided with read only access to said second voice file, and said second voice messaging platform is further provided with read only access to said first voice files, wherein the first and second nodes' read/write access to the first and second voice files, respectively, dynamically transferable between odes such that only one node has read/write access to a particular voice file at any particular time; and wherein, during transfer of a node's read/write access to a voice file, there is no interruption of access to other voice files not involved in the transfer.

2. A messaging system as recited in claim 1, wherein either node may concurrently have read-write capabilities to multiple voice files.

3. A distributed voice messaging system, comprising:
   (a) a first node including a first voice messaging platform and a first voice file, wherein said first voice messaging platform is provided with read/write access to said first voice file; and
   (b) a second node including a second voice messaging platform and a second voice file, wherein said second voice messaging platform is provided with read/write access to said second voice file;
   wherein said fist voice message platform is Her provided with read only access to said second voice file, and said second voice messaging platform is further provided with read only access to said first voice file; wherein said first and second voice files are characterized by a structure including a plurality of records, wherein each record comprises a voice message segment (VMS) and recovery data (RD); wherein the first and second nodes' read/write access to the first and second voice files, respectively, is dynamically transferable between nodes such that only one node has read/write access to a particular voice file at any particular time; and wherein, during transfer of a node's read/write access to a voice file, there is no interruption of access to other voice files not involved in the transfer.

4. A messaging system as recited in claim 3, wherein said recovery data comprises a message number (MN) stored in at least one record for each message stored in the voice file.

5. A messaging system as recited in claim 4, wherein said MN is stored in a predefined field of each record.

6. A messaging system as recited in claim 4, wherein said recovery data further comprises, in records containing a last VMS of each message, pointers to first and second VMSs of the message.

7. A messaging system as recited in claim 4, wherein said recovery data further comprises, in each record except those containing a first and a last VMS of each message, a pointer to a next VMS and a previous VMS in the message.

8. A messaging system as recited in claim 7, wherein said recovery data further comprises, in each record containing said first VMS of each message, a pointer to a next VMS in the message.

9. A messaging system as recited in claim 7, wherein said recovery data further comprises, in each record containing said last VMS of each message, a pointer to a previous VMS in the message.

10. A messaging system as recited in claim 4, wherein said recovery data further comprises, in each record containing a last VMS of each message, an indication of the length of the message.

11. A messaging system as recited in claim 10, wherein the message length is given in terms of the number of bytes and the number of message segments in the message.

12. A messaging system as recited in claim 4, wherein said message number (MN) stored in the at least one record for each message comprises a voice file number identifying the voice file in which the message is stored, wherein the voice file number uniquely identifies only one of the voice files to which the messaging platforms have shared access.

13. A messaging system as recited in claim 12, wherein said message number (MN) further comprises an identification of the last VMS in the message.

14. A messaging system as recited in claim 13, wherein said message number (MN) further comprises an epoch number.

15. A messaging system as recited in claim 13, wherein said message number (MN) further comprises a timestamp.

16. A messaging system as recited in claim 15, wherein said timestamp is indicative of a time and a date on which the message was created.

17. A distributed voice message system, comprising:
(a) a first node including a first voice messaging platform and a first voice file, wherein said first voice messaging platform is provided with read/write access to said first voice file, and
(b) a second node including a second voice messaging platform and a second voice file, wherein said second voice messaging platform is provided with read/write access to said second voice file;
wherein said first voice messaging platform is further provided with read only access to said second voice file, and said second voice messaging platform is further provided with read only access to said first voice file; wherein said first an second voice files are characterized by a structure including a plurality of records, each record comprising a voice message segment (VMS) and recovery data (R), said RD comprising a message number (MN, wherein said MN coprises a voice file number uniquely identifying only one of the voice files to which the massaging platforms have shared access, an identification of the last VMS in the message, an epoch number, and a timestamp, wherein the timestamp is indicative of a time and a date on which the message was created; wherein the first and second nodes' read/write access to the first and second voice files, respectively, is dynamically transferable between nodes such that only one node has read/write access to a particular voice file at any particular time; and wherein, during transfer of a node's read/write access to a voice file, there is no interruption of access to other voice files not involved in the transfer.

18. A messaging system as recited in claim 17, wherein said recovery data (RD) further comprises:
in records containing a last VMS of each message, pointers to first and second VMSs of the message;
in records except those containing a first and the last VMS of each message, a pointer to a next VMS and a previous VMS in the message;
in records containing said first VMS of each message, a pointer to a next VMS in the message; and
in records containing said last VMS of each message, a pointer to a previous VMS in the message, and an indication of the length of the message, wherein the message length is given in terms of the number of bytes and the number of message segments in the message.

19. A distributed voice messaging system comprising:
(a) a first node including a first voice messaging platform and a first voice file, wherein said first voice messaging platform is provided wit read/write access to said first voice file;
(b) a second node including a second voice messaging platform and a second voice file, wherein said second voice messaging platform is provided with read/write access to said second voice file;
wherein said fist voice messaging platform is further provided with read only access to said second voice file, and said second voice messaging platform is further provided with read only access to ad first voice file; wherein each of said first and second messaging platforms comprises a computer and a network applications platform; wherein the first and second nodes' read/write access to the first and second voice files, respectively, is dynamically transferable between nodes such that only one node has read/write access to a particular voice file at any particular time; and wherein during transfer of a node's read/write access to a voice file, there is no interruption of access to other voice files not involved in the transfer.

20. A distributed voice messaging system, comprising:
(a) a first node including a first voice messaging platform and a first voice file, wherein said fist voice messaging platform is provided with read/write access to said first voice file; and
(b) a second node including a second voice meshing platform and a second voice file, wherein said second voice messaging platform is provided with read/write access to said second voice file;
wherein said first voice messaging platform is further provided with read only access to said second voice file, and said second voice messaging platform is further provided with read only access to said fist voice file; wherein each of said first and second messaging platforms is operatively coupled to a network interface unit (NIU); wherein the first and second nodes' read/write access to the first and second voice files, respectively, is dynamically transferable between nodes such that only one node has read/write access to a particular voice file at any particular time, and wherein, during transfer of a node's read/write access to a voice file, there is no interruption of access to other voice files not involved in the transfer.

21. A messaging system as recited in claim 20, wherein each of said first and second messaging platforms is operatively coupled to at least two NIUs.

22. A messaging system as recited in claim 21, wherein said first and second messaging platforms are coupled via a bus to at least two NIUs.

23. A messaging system as recited in claim 21, wherein said first and second messaging platforms are coupled to at least one NIU via a telecommunications network.

24. A method for use with a distributed voice messaging system comprising a first node including a first voice messaging platform and a first voice file, and a second node including a second voice messaging platform and a second voice file, comprising the steps of:
providing said first voice messaging platform with read/write access to said first voice file;
providing said second voice messaging platform with read/write access to said second voice file;
further providing said first voice messaging platform with read only access to said second voice file; and
further providing said second voice messaging platform with read only access to said fist voice file;
wherein said first and second voice files are formed with a structure including a plurality of records, wherein each record comprises a voice message segment (VMS) and recovery data (RD); wherein the first and second nodes' read/write access to the first and second voice files, respectively, is dynamically transferable between nodes such that only one node has read/write access to a particular voice file at any particular time; and wherein, during transfer of a node's read/write access to a voice file, there is no interruption of access to other voice files not involved in the transfer.

25. A method as recited in claim 24, wherein said recovery data comprises a message number (MN) stored in at least one record for each message stored in the voice file.

26. A method as recited in claim 25, wherein said MN is stored in a predefined field of each record containing a last VMS of each message.

27. A method as recited in claim 25, wherein said recovery data further comprises, in records containing a last VMS of each message, pointers to first and second VMSs of the message.

28. A method as recited in claim 25, wherein said recovery data further comprises, in each record except those containing a first and a last VMS of each message, a pointer to a next VMS and a previous VMS in the message.

29. A method as recited in claim 28, wherein said recovery data further comprises, in each record containing said first VMS of each message, a pointer to a next VMS in the message.

30. A method as recited in claim 28, wherein said recovery data further comprises, in each record containing said last VMS of each message, a pointer to a previous VMS in the message.

31. A method as recited in claim 25, wherein said recovery data further comprises, in each record containing a last VMS of each message, an indication of the length of the message.

32. A method as recited in claim 31, wherein the message length is given in terms of the number of bytes and the number of message segments in the message.

33. A method as recited in claim 25, wherein said message number (MN) stored in the at least one record for each message comprises a voice file number identifying the voice file in which the message is stored, wherein the voice file number uniquely identifies only one of the voice files to which the messaging platforms have shared access.

34. A method as recited in claim 33, wherein said message number (MN) further comprises an identification of the last VMS in the message.

35. A method as recited in claim 34, wherein said message number (MN) further comprises an epoch number.

36. A method as recited in claim 34, wherein said message number (MN) further comprises a timestamp.

37. A method as recited in claim 36, wherein said timestamp is indicative of a time and a date on which the message was created.

38. A method as recited in claim 24, said RD comprising a message number (MN) stored in each record containing a last VMS of each message, wherein said MN comprises a voice file number uniquely identifying only one of the voice files to which the messaging platforms have shared access, an identification of the last VMS in the message, an epoch number, and a timestamp, wherein the timestamp is indicative of a time and a date on which the message was created.

39. A method as recited in claim 38, wherein said recovery data (RD) further comprises:
in records containing a last VMS of each message, pointers to first and second VMSs of the message;
in records except those containing a first and the last VMS of each message, a pointer to a next VMS and a previous VMS in the message;
in records containing said first VMS of each message, a pointer to a next VMS in the message; and
in records containing said last VMS of each message, a pointer to a previous VMS in the message, and an indication of the length of the message, wherein the message length is given in terms of the number of bytes and the number of message segments in the message.

40. A method as recited in claim 24, wherein the first and second nodes' read/write access to the first and second voice files, respectively, is dynamically transferable between nodes such that only one noded has read/write access to a particular voice file at any particular time; wherein either node may concurrently have read/write capabilities to multiple voice files; and wherein, during transfer of a node's read/write access to a voice file, there is no interruption of access to other voice files not involved in the transfer.

41. A distributed voice file system stored on computer readable media, comprising a plurality of records, wherein each record comprises a voice message segment (VMS) and recovery data (RD); wherein each VMS is associated with one of a plurality of voice messages, and wherein said recovery data comprises a message number (MN stored in at least one record or each message stored in the voice file system; and wherein the MN associated with each message is unique as compared to the MNs associated with other messages in the voice file system; wherein the first and second nodes' read/write access to the fast and second voice files, respectively, is dynamically transferable between nodes such that only one node has read/write access to a particular voice file at any particular time; and wherein during transfer of a node's read/write access to a voice file, there is no interruption of access to other voice files not involved in the transfer.

42. A distributed voice file system as recited in claim 41, wherein said recovery data comprises a message number (MN) stored in all records for each message stored in the voice file system.

43. A distributed voice file system as recited in claim 42, wherein said recovery data further comprises, in records containing a last VMS of each message, pointers to first and second VMSs of the message.

44. A distributed voice file system as recited in claim 43, wherein said recovery data further comprises, in each record except those containing a first and a last VMS of each message, a pointer to a next VMS and a previous VMS in the message.

45. A distributed voice file system as recited in claim 44, wherein said recovery data further comprises, in each record containing said first VMS of each message, a pointer to a next VMS in the message.

46. A distributed voice file system as recited in claim 45, wherein said recovery data further comprises, in each record containing said last VMS of each message, a pointer to a previous VMS in the message.

47. A distributed voice file system as recited in claim 46, wherein said recovery data further comprises, in each record containing a last VMS of each message, an indication of the length of the message.

48. A distributed voice file system as recited in claim 47, wherein the message length is given in terms of the number of bytes and the number of message segments in the message.

49. A distributed voice file system as recited in claim 42, wherein said voice file system comprises a plurality of voice files, and wherein the MN for each message comprises a voice file number uniquely identifying only one of the voice files.

50. A distributed voice file system as recited in claim 49, wherein the MN for each message further comprises an identification of the last VMS in the message, an epoch number, and a timestamp, wherein the timestamp is indicative of a time and a date on which the message was created.

51. A distributed voice file system as recited in claim 50, wherein the timestamp is indicative of a time and a date on which the message was created.

52. A distributed voice file system as recited in claim 42, wherein said recovery data (RD) further comprises:

in records containing a last VMS of each message, pointers to first and second VMSs of the message;

in records except those containing a first and the last VMS of each message, a pointer to a next VMS and a previous VMS in the message;

in records containing said first VMS of each message, a pointer to a next VMS in the message; and in records containing said last VMS of each message, a pointer to a previous VMS in the message, and an indication of the length of the message, wherein the message length is given in terms of the number of bytes and the number of message segments in the message.

\* \* \* \* \*